(12) United States Patent
Manhart et al.

(10) Patent No.: US 6,313,951 B1
(45) Date of Patent: *Nov. 6, 2001

(54) OPTICAL SYSTEM WITH ZERNIKE-SHAPED CORRECTOR

(75) Inventors: Paul K. Manhart; David Knapp; Scott Ellis, all of Tucson, AZ (US); Scott W. Sparrold, Bothell, WA (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,611

(22) Filed: Feb. 1, 2000

Related U.S. Application Data

(63) Continuation-in-part of application No. 09/164,436, filed on Sep. 30, 1998, now Pat. No. 6,028,712.
(60) Provisional application No. 60/060,870, filed on Oct. 2, 1997.

(51) Int. Cl.[7] .......................... G02B 27/22; G02B 13/06; G02B 7/02
(52) U.S. Cl. .......................... 359/642; 359/479; 359/725; 359/637; 359/554; 359/815; 359/753; 244/3.17
(58) Field of Search .................................. 359/642, 725, 359/712, 637, 635, 815, 823, 479, 506, 554, 894, 511, 749, 753; 244/3.15, 3.17, 3.1

(56) References Cited

U.S. PATENT DOCUMENTS

| | | | |
|---|---|---|---|
| 3,841,585 | 10/1974 | Evers-Euterneck | 244/3.15 |
| 4,111,558 | 9/1978 | Ikemori | 359/708 |
| 5,814,803 | 9/1998 | Olmstead | 235/462.01 |
| 6,018,424 | 1/2000 | Morgan et al. | 359/708 |
| 6,028,712 | * 2/2000 | McKenney et al. | 359/642 |

OTHER PUBLICATIONS

Max Born et al., "Principles of Optics", Sixth Corrected Edition, Pergamon Press, pp. 464–468 and 767–772 (1991).
Robert R. Shannon et al., "Applied Optics and Optical Engineering", vol. XI, Academic Press, pp. 28–39 (1992).
Optical Research Associates, Code V Version 8.30 Reference Manual, vol. I, pp. 2A–449 to 2A–453, Aug. 1998.

* cited by examiner

Primary Examiner—Evelyn A Lester

(57) ABSTRACT

An optical system includes a curved window, an optical corrector adjacent to a curved inner surface of the window, an optical train positioned such that the optical corrector lies between the curved window and the optical train, a movable optical train support upon which the optical train is mounted, and a sensor disposed to receive an optical ray passing sequentially through the window, the optical corrector, and the optical train. The optical corrector has an inner surface and an outer surface, at least one of which has a shape described by a modified Zernike polynomial surface.

13 Claims, 4 Drawing Sheets

OPTICAL SYSTEM WITH ZERNIKE-SHAPED CORRECTOR

This application is a continuation-in-part of application Ser. No. 09/164,436, filed Sep. 30, 1998, now U.S. Pat. No. 6,028,712 for which priority is claimed and whose disclosure is incorporated herein by reference; application Ser. No. 09/164,436 which is now U.S. Pat. No. 6,028,712 in turn claims priority to, and the benefit of, U.S. Provisional Application No. 60/060,870, filed Oct. 2, 1997, for which priority is claimed and whose disclosure is incorporated herein by reference.

BACKGROUND OF THE INVENTION

This invention relates to an optical system having a window therein, and in particular to such an optical system having an optical corrector that reduces aberration introduced by the passage of an optical ray through the window.

An optical sensor receives radiated energy from a scene and converts it to an electrical signal. The electrical signal is provided to a display or further processed for pattern recognition or the like. Optical sensors are available in a variety of types and for wavelengths ranging from the ultraviolet, through the visible, and into the infrared In some applications the optical sensors are fixed in orientation, and in others the optical sensors are movable by pivoting and/or rotational motions to allow sensing over a wide angular field of regard.

The optical sensors generally employ a photosensitive material that faces the scene and produces an electrical output responsive to the incident energy. The photosensitive material and remainder of the sensor structure are rather fragile, and are easily damaged by dirt, erosion, chemicals, or high air velocity. In service, the sensor is placed behind a window through which it views the scene and which protects the sensor from such external effects. The window must be transparent to the radiation of the operating wavelength of the sensor and must resist attack from the external forces. The window must also permit the sensor to view the scene over the specified field of regard.

The window would ideally introduce no wavefront aberration at the center of the field of view, other than possibly spherical aberration, particularly if the sensor is an imaging sensor. The thicker and more highly curved is the window, the more likely is the introduction of significant wavefront aberration. A wide variety of sensor windows have been used in various aircraft applications. In many cases such as low-speed commercial helicopters, flat windows are acceptable. Windows that are shaped as segments of spheres are used in aircraft and missile applications, but for these windows the wavefront aberration tends to be high if the gimbal location is not at the spherical window's center of curvature. In all of these window types, if the window must be wide or must project a substantial distance into an airflow to permit a large field of regard, the aerodynamic drag introduced by the window is large.

For applications involving aircraft (including missiles) operating at high speeds, the window should be relatively aerodynamic such that the presence of the window extending into the airstream does not introduce unacceptably high and/or asymmetric aerodynamic drag to the vehicle. A nonspherical or conformal window is therefore beneficial in reducing drag and increasing the speed and range of the aircraft. However, available conformal windows introduce large wavefront aberrations into the sensor beam, particularly for high azimuthal pointing angles of the sensor.

The wavefront aberration may be corrected computationally, but the required amount of processing may be great. To reduce the amount of computation or eliminate the need for computation, the wavefront aberration of the image may be minimized optically, either in the optical processing components or by providing a particular shape in the window. Available approaches have not been fully successful in accomplishing this type of correction. Accordingly, there is a need for an improved approach to providing a corrected image in an optical system viewing a scene through an aspheric window. The present invention fulfills this need, and further provides related advantages.

SUMMARY OF THE INVENTION

The present invention provides an optical system and a method for providing corrected optical images using the optical system. The optical system is used with many types of aspheric windows. It may be tailored to provide minimal wavefront aberration over a wide range of azimuthal pointing angles of the sensor of the optical system.

In accordance with the invention, an optical system comprises a window having a curved outer surface and a curved inner surface, and an optical corrector adjacent to the curved inner surface of the window. The optical corrector has an optical corrector shape which is selected responsive to a shape of the window. The optical corrector has an inner surface and an outer surface, with at least one of the inner surface and the outer surface of the optical corrector having a shape described by a modified Zernike expression of the form $$z = \frac{cr^2}{1+\sqrt{1-(1+k)c^2r^2}} + \sum_{j=1}^{j=66} C_{j+1}Z_j$$

where z is a coordinate oriented perpendicular to a reference plane, c is a constant vertex curvature, $r^2=x^2+y^2$, x and y are Cartesian coordinates lying in the reference plane, k is a conic constant, $C_{j+1}$ is a constant coefficient for $Z_j$, and $Z_j$ is the jth Zernike polynomial term. Preferably, both the inner surface and the outer surface of the optical corrector have the shape described by the modified Zernike expression. The optical system further includes an optical train positioned such that the optical corrector lies between the curved window and the optical train, wherein the optical train includes at least one optical element operable to alter an optical ray incident thereon, a movable optical train support upon which the optical train is mounted, and a sensor disposed to receive the optical ray passing sequentially through the window, the optical corrector, and the optical train. The optical train support preferably comprises a gimbal, and most preferably is a roll-nod gimbal.

The optical corrector, having a shape described by a modified Zernike polynomial surface, is well suited to correct the aberrations introduced into the optical ray by its passage through the window. The modified Zernike form is sufficiently flexible to define both shallow and deep surfaces. (A shallow surface has an axial component or depth which is relatively small compared to its maximum lateral extent, and a deep surface has a depth relatively large compared to its lateral extent.) When the Zernike polynomial surface is a relatively shallow surface, the optical corrector having the modified Zernike shape may be readily manufactured and tested. Other proposed types of correctors have deeper concavity, and are much more difficult to manufacture and test. Even though the modified Zernike-shape optical corrector may be made with a relatively shallow depth, it is still operable to correct aberrations introduced by elongated windows with a high fineness (aspect) ratio. The window may therefore be designed to introduce less drag into the aircraft, resulting in longer range and higher speed.

The window is preferably mounted in a housing having an axis of elongation. The optical corrector, which preferably comprises an arched strip of transparent material having an axial component extending along the axis of elongation and a radial component extending outwardly from the axis of elongation, may be rotatable about the axis of elongation. The optical corrector support and the optical train support may also be movable parallel to the axis of elongation, with each movement independent of the other.

The optical system thus includes the aspheric window, which introduces an aberration into the optical ray that is dependent upon the pointing angle of the sensor through the window, and the optical corrector, which partially or totally negates the aberration. The optical corrector functions as a corrective lens whose position may optionally be rotated about the axis of elongation and/or moved parallel to the axis of elongation. The Zernike optical corrector may be used in a multiple-corrector system, together with other Zernike optical correctors or optical correctors of other forms, as needed for particular window shapes. The position of the optical train may also optionally be adjusted along the axis of elongation. These optical components and their adjustability serve to reduce the aberration introduced by the passage of the optical ray through the window.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
FIG. 1 is an elevational view of a missile having a nose-dome window.

FIG. 1 depicts a flight vehicle, in this case a supersonic missile 20, having a fuselage 22 with a curved window 24 attached thereto. The window 24 is illustrated as a nose dome that protrudes at least partially into the airstream of the missile 20. The fuselage 22 is elongated along an axis of elongation 25, and in a preferred application the window 24 is rotationally symmetric about the axis 25. The missile 20 with the nose-dome window 24 is the preferred application of the optical system of the invention, but it is applicable in other contexts as well such as other missile windows and windows on manned aircraft.

Figure 2:
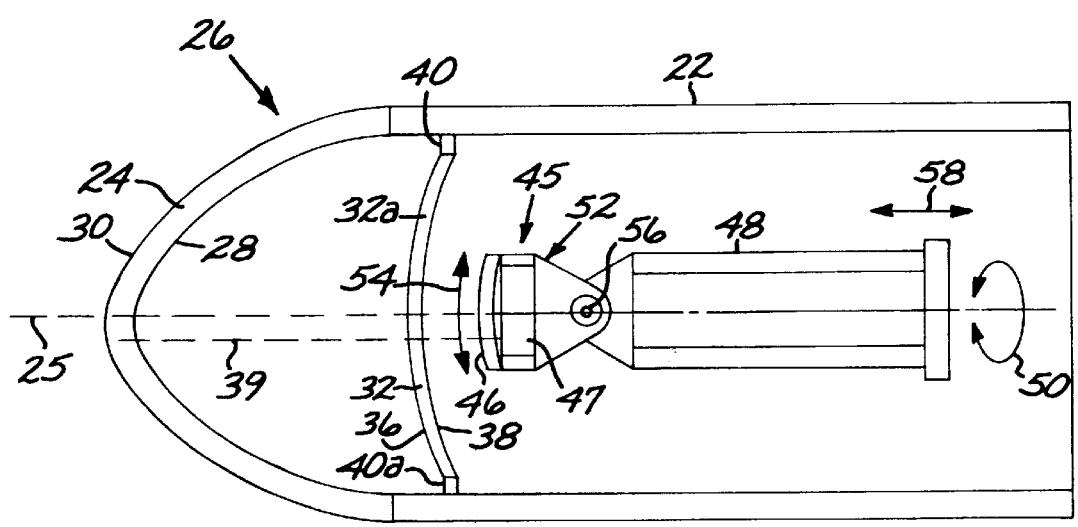
FIG. 2 is a schematic diagram of a first embodiment of an optical system according to the invention.
Figure 3:
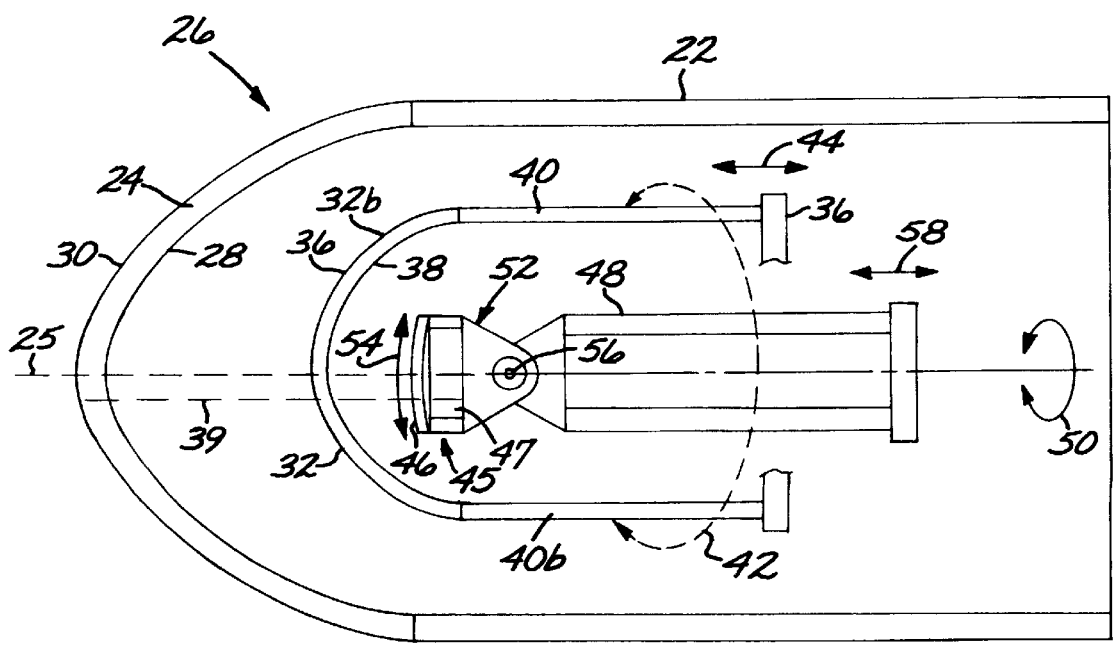
FIG. 3 is a schematic diagram of a second embodiment of an optical system according to the invention.

The window 24 is part of an optical system 26, two embodiments of which are shown generally in FIGS. 2 and 3. The optical system 26 includes the window 24 attached to the fuselage 22, which serves as a housing for the optical system 26. A curved inner surface 28 of the window 24 is the concave surface of the window 24 that faces the inside of the fuselage 22. A curved outer surface 30 of the window 26 is the convex surface of the window 24 that faces outwardly and projects into the airstream as the missile 20 flies. The window 24 in general has a spatially dependent curvature.

An optical corrector 32 is located adjacent to the inner surface 28 of the window 24. The optical corrector 32 is a curved piece of material transparent to the radiation being sensed by the optical system 26 and its sensor. For example, for a visible-radiation optical system, the optical corrector 32 may be glass.

Figure 4:
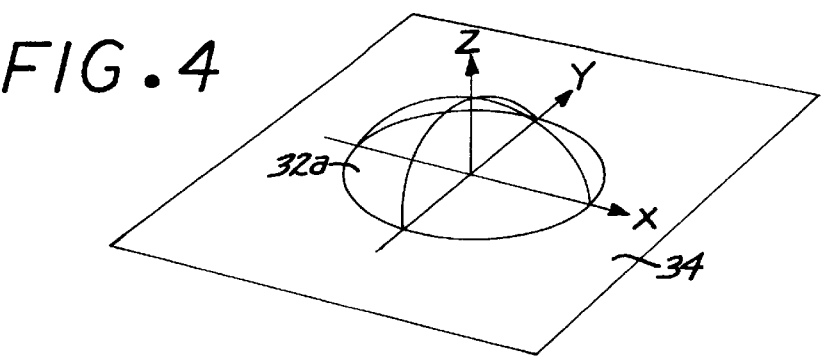
FIG. 4 is a perspective view of the optical corrector of the first embodiment of FIG. 2.
Figure 5:
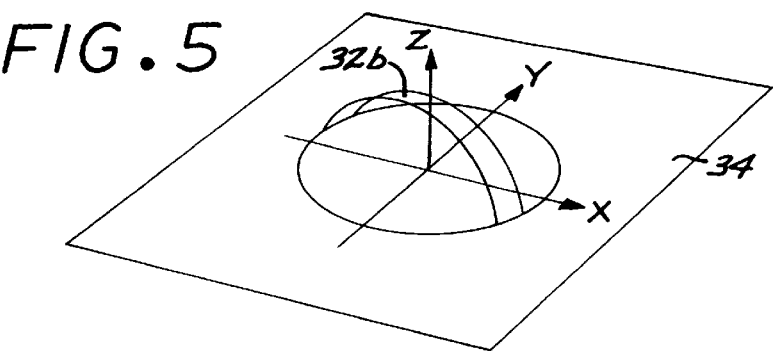
FIG. 5 is a perspective view of the optical corrector of the second embodiment of FIG. 3.

The optical corrector 32 may be described in three orthogonal Cartesian coordinates in terms of its shape relative to a reference plane 34, illustrated in FIGS. 4 and 5, having x and y axes lying in the plane 34 and a z axis perpendicular to the plane 34. The optical corrector 32a of the embodiment of FIG. 2, shown in perspective in FIG. 4, comprises an arched surface of revolution about the z axis. The optical corrector 32b of the embodiment of FIG. 3, shown in perspective in FIG. 5, comprises an arch segment of a surface of revolution about the z axis. The optical corrector 32b may alternatively be described as an arched strip of the transparent material. In each case the optical correctors 32a and 32b have a convex outer surface 36 facing the inner surface 28 of the window 24, and an oppositely disposed concave inner surface 38.

Whether the optical corrector 32 is in the form of a surface of revolution as in the optical corrector 32a or in the form of a strip as in the optical corrector 32b, at least one of the outer surface 36 and the inner surface 38 of the optical corrector 32 has a shape described by a modified Zernike polynomial of the form $$z = \frac{cr^2}{1 + \sqrt{1 - (1+k)c^2 r^2}} + \sum_{j=1}^{j=66} C_{j+1} Z_j$$

In this relation, z is the coordinate oriented perpendicular to the reference plane 34, c is a constant which is the curvature of the vertex of the optical corrector 32, $r^2 = x^2 + y^2$, x and y are the Cartesian coordinates lying in the reference plane 34, k is a constant value which is the conic constant, $C_{j+1}$ is a constant coefficient for $Z_j$, and $Z_j$ is the jth Zernike polynomial term. This modified Zernike polynomial may be viewed as a base conic shape (the first term) plus a Zernike polynomial (the second term). Preferably, both the outer surface 36 and the inner surface 38 have the shape defined by the modified Zernike polynomial, but not necessarily the same modified Zernike polynomial. However, one of the surfaces 36 or 38 could have another, non-Zernike form.

The Zernike polynomial $$\sum_{j=1}^{j=66} C_{j+1} Z_j$$

is a known form. For example, a full discussion of Zernike polynomials and the values of the Zernike polynomial terms $Z_j$ may be found in the Code V Reference Manual, Optical Research Associates, 1998, pages 2A-449 to 2A-45 1; Robert R. Shannon and James C. Wyant, "Applied Optics and Optical Engineering, Volume XI", Academic Press, 1992, pages 28–38; and Max Born and Emil Wolf, "Principles of Optics", Pergamon Press, 1980, pages 464–468 and 767–772.

The 66 Zernike polynomial terms $Z_j$ are available in standard references, such as the Code V Reference Manual. In the Zernike polynomial, the terms $Z_j$ are given by the following expressions, in spherical (radius R, angle θ) coordinates.

$Z_1 = 1$
$Z_2 = R \cos \theta$
$Z_3 = R \sin \theta$
$Z_4 = R^2 \cos 2\theta$
$Z_5 = 2R^2 - 1$
$Z_6 = R^2 \sin 2\theta$
$Z_7 = R^3 \cos 3\theta$
$Z_8 = 3R^3 \cos \theta - 2R \cos \theta$
$Z_9 = 3R^3 \sin \theta - 2R \sin \theta$
$Z_{10} = R^3 \sin 3\theta$
$Z_{11} = R^4 \cos 4\theta$
$Z_{12} = 4R^4 \cos 2\theta - 3R^2 \cos 2\theta$
$Z_{13} = 6R^4 - 6R^2 + 1$
$Z_{14} = 4R^4 \sin 2\theta - 3R^2 \sin 2\theta$
$Z_{15} = R^4 \sin 4\theta$
$Z_{16} = R^5 \cos 5\theta$
$Z_{17} = 5R^5 \cos 3\theta - 4R^3 \cos 3\theta$
$Z_{18} = 10R^5 \cos \theta - 12R^3 \cos \theta + 3R \cos \theta$
$Z_{19} = 10R^5 \sin \theta - 12R^3 \sin \theta + 3R \sin \theta$
$Z_{20} = 5R^5 \sin 3\theta - 4R^3 \sin 3\theta$
$Z_{21} = R^5 \sin 5\theta$
$Z_{22} = R^6 \cos 6\theta$
$Z_{23} = 6R^6 \cos 4\theta - 5R^4 \cos 4\theta$
$Z_{24} = 15R^6 \cos 2\theta - 20R^4 \cos 2\theta + 6R^2 \cos 2\theta$
$Z_{25} = 20R^6 - 30R^4 + 12R^2 - 1$
$Z_{26} = 15R^6 \sin 2\theta - 20R^4 \sin 2\theta + 6R^2 \sin 2\theta$
$Z_{27} = 6R^6 \sin 4\theta - 5R^4 \sin 4\theta$
$Z_{28} = R^6 \sin 6\theta$
$Z_{29} = R^7 \cos 7\theta$
$Z_{30} = 7R^7 \cos 5\theta - 6R^5 \cos 5\theta$
$Z_{31} = 21R^7 \cos 3\theta - 30R^5 \cos 3\theta + 10R^3 \cos 3\theta$
$Z_{32} = 35R^7 \cos \theta - 60R^5 \cos \theta + 30R^3 \cos \theta - 4R \cos \theta$
$Z_{33} = 35R^7 \sin \theta - 60R^5 \sin \theta + 30R^3 \sin \theta - 4R \sin \theta$
$Z_{34} = 21R^7 \sin 3\theta - 30R^5 \sin 3\theta + 10R^3 \sin 3\theta$
$Z_{35} = 7R^7 \sin 5\theta - 6R^5 \sin 5\theta$
$Z_{36} = R^7 \sin 7\theta$
$Z_{37} = R^8 \cos 8\theta$
$Z_{38} = 8R^8 \cos 6\theta - 7R^6 \cos 6\theta$
$Z_{39} = 28R^8 \cos 4\theta - 42R^6 \cos 4\theta + 15R^4 \cos 4\theta$
$Z_{40} = 56R^8 \cos 2\theta - 105R^6 \cos 2\theta + 60R^4 \cos 2\theta - 10R^2 \cos 2\theta$
$Z_{41} = 70R^8 - 140R^6 + 90R^4 - 20R^2 + 1$
$Z_{42} = 56R^8 \sin 2\theta - 105R^6 \sin 2\theta + 60R^4 \sin 2\theta - 10R^2 \sin 2\theta$
$Z_{43} = 28R^8 \sin 4\theta - 42R^6 \sin 4\theta + 15R^4 \sin 4\theta$
$Z_{44} = 8R^8 \sin 6\theta - 7R^6 \sin 6\theta$
$Z_{45} = R^8 \sin 8\theta$
$Z_{46} = R^9 \cos 9\theta$
$Z_{47} = 9R^9 \cos 7\theta - 8R^7 \cos 7\theta$
$Z_{48} = 36R^9 \cos 5\theta - 56R^7 \cos 5\theta + 21R^5 \cos 5\theta$
$Z_{49} = 84R^9 \cos 3\theta - 168R^7 \cos 3\theta + 105R^5 \cos 3\theta - 20R^3 \cos 3\theta$
$Z_{50} = 126R^9 \cos \theta - 280R^7 \cos \theta + 210R^5 \cos \theta - 60R^3 \cos \theta + 5R \cos \theta$
$Z_{51} = 126R^9 \sin \theta - 280R^7 \sin \theta + 210R^5 \sin \theta - 60R^3 \sin \theta + 5R \sin \theta$
$Z_{52} = 84R^9 \sin 3\theta - 168R^7 \sin 3\theta - 105R^5 \sin 3\theta - 20R^3 \sin 3\theta$
$Z_{53} = 36R^9 \sin 5\theta - 56R^7 \sin 5\theta + 21R^5 \sin 5\theta$
$Z_{54} = 9R^9 \sin 7\theta - 8R^7 \sin 7\theta$
$Z_{55} = R^9 \sin 9\theta$
$Z_{56} = R^{10} \cos 10\theta$
$Z_{57} = 10R^{10} \cos 8\theta - 9R^8 \cos 8\theta$
$Z_{58} = 45R^{10} \cos 6\theta - 72R^8 \cos 6\theta + 28R^6 \cos 6\theta$
$Z_{59} = 120R^{10} \cos 4\theta - 252R^8 \cos 4\theta + 168R^6 \cos 4\theta - 35R^4 \cos 4\theta$
$Z_{60} = 210R^{10} \cos 2\theta - 504R^8 \cos 2\theta + 420R^6 \cos 2\theta - 140R^4 \cos 2\theta + 15R^2 \cos 2\theta$
$Z_{61} = 252R^{10} - 630R^8 + 560R^6 - 210R^4 + 30R^2 - 1$
$Z_{62} = 210R^{10} \sin 2\theta - 504R^8 \sin 2\theta + 420R^6 \sin 2\theta - 140R^4 \sin 2\theta + 15R^2 \sin 2\theta$
$Z_{63} = 120R^{10} \sin 4\theta - 252R^8 \sin 4\theta + 168R^6 \sin 4\theta - 35R^4 \sin 4\theta$
$Z_{64} = 45R^{10} \sin 6\theta - 72R^8 \sin 6\theta + 28R^6 \sin 6\theta$
$Z_{65} = 10R^{10} \sin 8\theta - 9R^8 \sin 8\theta$
$Z_{66} = R^{10} \sin 10\theta$ The optical corrector 32 functions as a lens to correct the aberrations introduced into an optical (light) ray passing through the window 28, and therefore its shape is selected responsive to the shape of the window 28. Because the aberrations are spatially dependent upon the vector of the optical ray, the optical corrector 32 is formed so that its correction is spatially dependent as well. The aberrations introduced into the optical ray depend upon the exact shape of the window 24, and therefore no specific values of c, k, and $C_{j+1}$ which are applicable for all cases may be set forth for the shape of the optical corrector 32. Techniques for determining the design and the constant values are discussed subsequently.

Figure 6A:
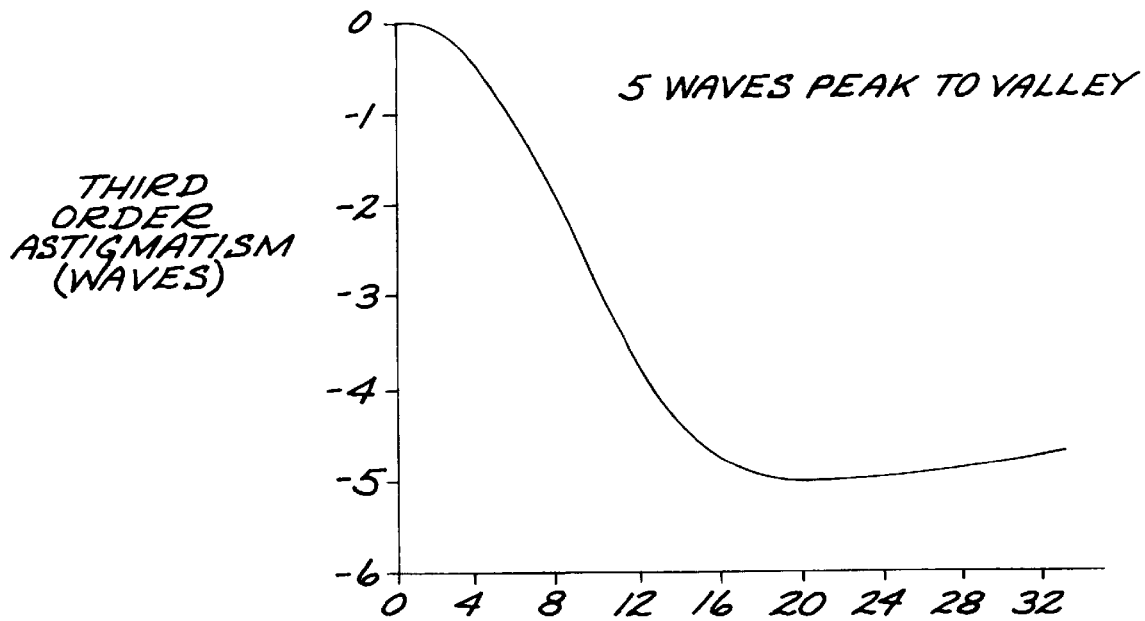
FIGS. 6A–6C are graphs of astigmatism as a function of field of regard (FOR) angle, for a window only (FIG. 6A), the optical corrector only (FIG. 6B), and the window plus the optical corrector (FIG. 6C)
Figure 6B:
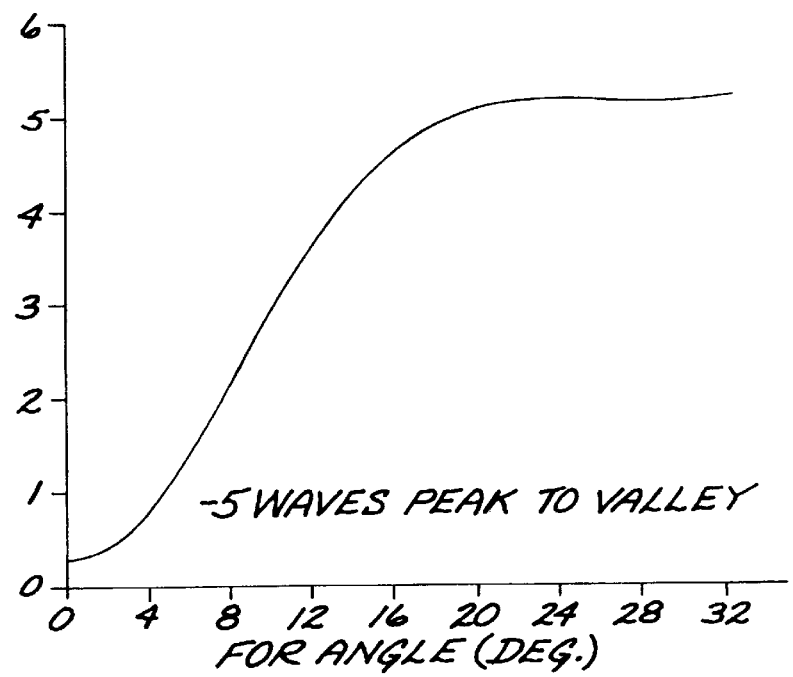

The selection of the modified Zernike shape of the optical corrector 32 yields important benefits to the optical corrector. First, it provides a good correction of aberration introduced into an optical ray that is distorted as it passes through the curved window 24. FIG. 6A depicts the calculated third order astigmatism introduced into an optical ray as it passes through a typical window of high fineness ratio as a function of the angle of the optical ray relative to the axis 25, termed the field of regard (FOR) angle. FIG. 6B is the calculated correction required to be applied by the optical corrector 32 having the modified Zernike shape, in order to produce an astigmatism profile of FIG. 6C. The optical corrector 32 reduces the third-order astigmatism from 5 waves peak-tovalley, to a maximum of 0.6 waves peak-to-valley over a range of angles from 0 degrees (looking along the axis 25) to 32 degrees off axis. A second advantage of the modified Zernike corrector is it may be defined to have a relatively shallow dish shape, where the height of the dome is relatively small as compared with the dimension at the base, as compared with other possible corrector shapes. The Zernike approach also allows the Zernike-shaped corrector to be defined to be relatively deep, if desired, with the height of the dome relatively large as compared with the dimension at the base. Third, the optical corrector having the shallow modified Zernike shape is easier to test for optical correctness than a more deeply dished optical corrector. Last, the modified Zernike shape may be manufactured in a relatively straightforward manner by preparing a base conic and then machining or etching away material to form the modified Zernike shape. The modified Zernike shape thus offers important advantages over other candidate shapes of optical correctors.

The optical corrector 32 is mounted on an optical corrector support 40, two types of which are shown in FIGS. 2 and 3, respectively. The optical corrector support 40a of FIG. 2 is a bracket mounted to the fuselage 22. With this form of optical corrector support 40a, the optical corrector 32a does not move relative to the window 24. The optical corrector support 40a is preferably used with that optical corrector 32a that comprises a surface of revolution about the z axis.

The optical corrector support 40b of FIG. 3 is itself supported so as to rotate about the axis 25, indicated schematically at numeral 42, and/or move linearly parallel to the axis 25, indicated schematically at numeral 44. This optical corrector support 40b is preferably used with the strip-form optical corrector 32b, although it may be used with other forms of the optical corrector 32 such as the optical corrector 32a. The rotational and linear movements are produced by conventional actuators, which are known for use in other applications. The rotational movement 42 of the optical corrector support 40, and thence of the optical corrector 32, allows the optical corrector to be rotationally positioned according to the rotational angle of regard of the optical train, to be discussed subsequently. The axial movement 44 of the optical corrector support 40, and thence of the optical corrector 32, allows different portions of the optical corrector 32 to be used to correct the aberration introduced by the window 24.

An optical train 45 is positioned such that the optical corrector 32 lies between the window 24 and the optical train 45. The optical train 45 includes at least one optical element operable to alter an optical ray incident thereon. In FIGS. 2 and 3, the optical element is illustrated as a refractive lens 46, but it may also include a mirror, a prism, or any other operable optical element. The optical element may also include a combination of such lenses, mirrors, and/or prisms. The detailed design of optical trains is known in the art, and the present invention is not concerned with such design specifics.

The optical train 45 directs incident optical rays 39, which previously passed first through the window 24 and then through the optical corrector 32, to a sensor 47. The sensor 47 is illustrated as a focal plane array sensor, but it may be of any operable type. The sensor 47 is selected according to the nature of the energy to be sensed, and is typically a sensor of visible light or infrared energy. The design of such sensors 47 is known in the art. The sensor 47 provides its output as an electrical signal to processing electronics, which are not illustrated but which are known in the art.

The optical train 45 is mounted on a movable optical train support 48. The movement characteristics of the optical train support 48 are selected to permit the optical train 45 to point in the desired directions, and also to take advantage of the corrective properties of the optical corrector 32. To allow the optical train 45 to point in the desired directions, a preferred roll/nod movement is illustrated in FIGS. 2 and 3. The optical train support 48 rotates about the axis of elongation 25, as indicated by arrow 50. A gimbal 52 produces a nodding movement indicated by arrow 54 about a transverse axis 56 that is perpendicular to the axis of elongation 25 (and thence to the axis of rotation). The combination of movements 50 and 54 allows the optical train 45 to be pointed in any desired rotational and azimuthal direction within a field of regard. In another approach within the scope of the present invention, the optical train 45 may be mounted on an X-Y rotational gimbal support, which permits the optical train 45 to rotate about two transverse axes, so that the rotational movement is not required.

The entire optical train 45 may optionally be moved forwardly or rearwardly parallel to the axis of elongation 25 by a linear axial movement, indicated by arrow 58. The axial movement 58 of the optical train support 48 allows the optical train 45 to be positioned for optimal performance relative to the window 24 and to the optical corrector 32. The movements 50, 54, and 58 are produced by conventional actuators which are known for other purposes.

The movements 42 and 44 of the optical corrector 32, where provided, and the movements 50, 54, and 58 of the optical train 45, where provided, may be entirely independent of each other or may be mechanically and/or electrically linked. For example, the rotational movement 42 of the optical corrector 32 may be linked together with, or even accomplished by the same actuator as, the rotational movement 50 of the optical train 45. In that case, the optical train 45 looks through the same portion of the optical corrector 32 for all angles of rotation, about the axis of elongation 25. Similar linkages are possible for the axial movements 44 and 58, for example.

Figure 8:
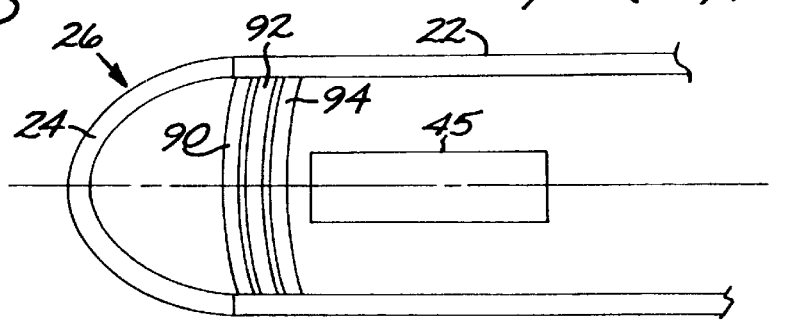
FIG. 8 is a schematic diagram of a third embodiment of an optical system according to the invention.

The corrector 32 having the modified Zernike form may be used alone, or in conjunction with other corrector elements. FIGS. 2–3 illustrate a single corrector 32 having the modified Zernike form. FIG. 8 schematically illustrates an optical system 26 having a first corrector 90 with the modified Zernike form, a second corrector 92 with a modified Zernike form different from that of the optical corrector 90, and a third corrector 94 with a form other than a modified Zernike form. In FIG. 8, elements common to the other embodiments are assigned the same reference numerals, and the discussion of these other elements is incorporated here. The various optical correctors may be used in any operable combination, with some or all stationary and some or all movable. In this embodiment, the optical train 45 is illustrated in a general form.

Figure 7:
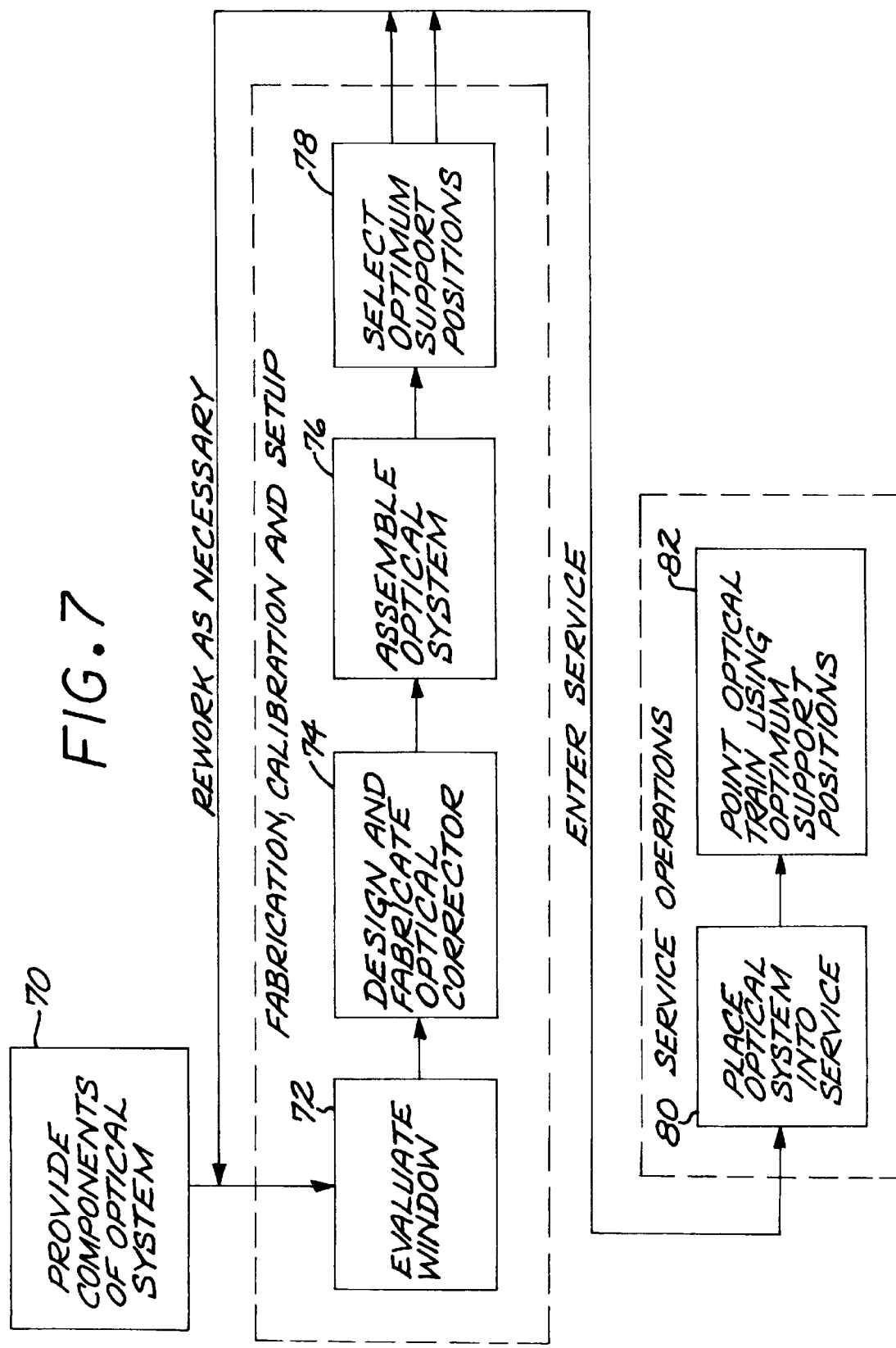
FIG. 7 is a block flow diagram for an approach to designing, manufacturing, and using the optical system.

FIG. 7 depicts a preferred approach for designing, tailoring, and operating the optical system 26. The physical components of the optical system, as described previously, are provided, numeral 70. The optical corrector 32 is designed and fabricated, and the movements 42, 44, 50, 54, and 58 are interrelated and programmed for subsequent service applications, using an iterative procedure, numerals 72, 74, 76, and 78.

First, the optical characteristics of the window 24 are evaluated, numeral 72. This evaluation establishes the nature of the aberration introduced into the wavefront of an incident optical ray as it passes through the window 24, for all relevant incident positions and angles. This evaluation may be performed using conventional optical ray analysis and the known and/or measured shape of the window 24. The shape of the window 24 is dictated primarily by aerodynamic requirements, but it may also be fine-tuned according to optical requirements.

Figure 6C:
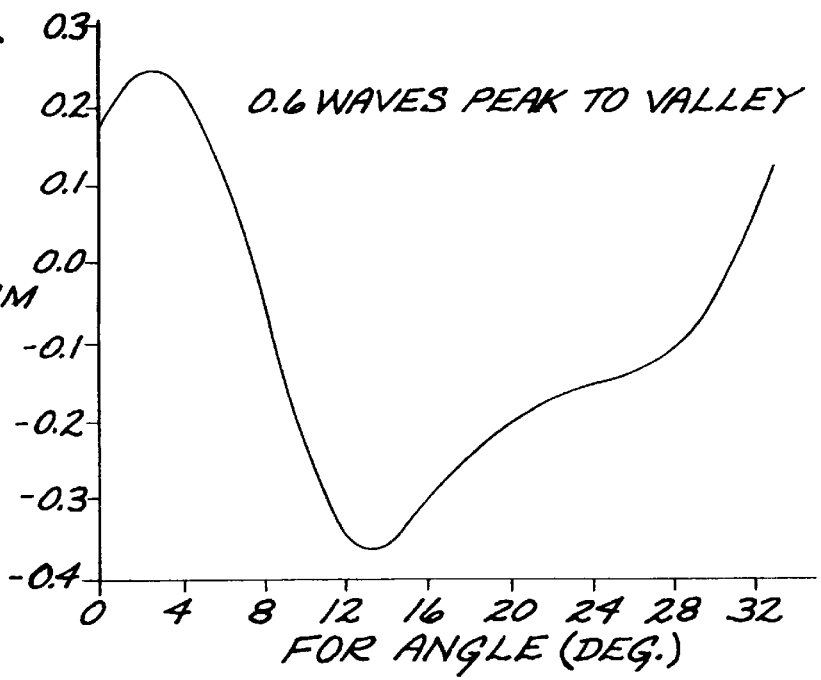

The required shape and position of the optical corrector 32 are calculated as a function of its position and the incident optical ray positions and angles, using conventional optical ray analysis, responsive to the shape of the window. The shape and positioning (where the optical corrector support 40 is movable) of the optical corrector 32 are chosen to establish selected optical characteristics of the optical beam after it has passed through the window 24 and the optical correctors 32. Examples of such characteristics include deviation of the apparent angle to the target, optical power or focal length as a function of optical ray position and angle, and axially symmetric aberration. The designed shape of the optical corrector 32 is then selected to adjust for, and desirably negate, asymmetric aberrations such as coma and astigmatism. In this analysis the symmetric aberrations are typically chosen to be constant as the elevation angle is changed, whereas the asymmetric aberrations that change with elevation angle are corrected to acceptably small values. In the final stages of the design process, the optical elements of the optical train 45 are designed to correct all of the symmetrical aberrations to acceptably small values. These aberrations have been rendered nearly constant by the prior design steps. FIGS. 6A–6C illustrate the result of such a design procedure that minimizes the aberration of the optical ray that reaches the optical train 45, for one particular window shape. Other operable design procedures may alternatively be used instead of this preferred approach. In the design process, the values of the constants c, k, and $C_j$ are determined. Based upon the design process, the optical corrector is fabricated, numeral 74.

The selection of the design of the optical corrector 32 is thus distinct from conventional design of the optical train 45. The shape of the optical corrector 32 is selected responsive to the characteristics of the window 24, and its shape is related to that of the window in the sense that the optical corrector is designed to correct for aberrations introduced by the window. The optical corrector 32 is therefore primarily used in conjunction with non-spherical windows, where correction of aberrations is more difficult than for spherical windows. By comparison, the optical train 45 is designed to alter the ray path substantially independent of considerations of the shape of the window, so as to achieve particular properties of the optical beam when it reaches the sensor 47.

The window 24, the optical corrector 32, and the optical train 45 are mounted on the fuselage 22, optical corrector support 40, and optical train support 48, respectively, numeral 76. Test optical signals received at the sensor 47 are evaluated during manufacturing. The associated values of such of the movements 42, 44, 50, 54 and 58 that are provided which yield the optimal optical properties are determined and stored in a computer memory, numeral 78. If these received optical signal properties are acceptable and within specifications, the manufacturing and assembly process is complete. Errors and aberrations are also determined and stored, so that they may be accounted for by other processing. If the results achieved are not acceptable, the steps 72, 74, 76, and 78 are repeated as necessary until acceptable results are obtained. Typically, the modification may be achieved by reworking the optical corrector 32 until its properties are acceptable, by polishing, grinding, machining and other known working operations, and then repeating the steps 72, 74, 76, and 78.

Once the optical corrector 32 is fabricated and the positions of the movements 42, 44, 50, 54, and 58 yielding acceptable optical properties are known, the missile is placed into service, numeral 80. When the optical system 26 is to be used during service, the angular positions of the movements 50 and 54 are typically chosen in order to point the optical train 45 along a desired line of sight. The optimum angular positions of the other movements 42, 44, and 58 (collectively, the "support positions"), associated with those desired angular positions of the movements 50 and 54, are recalled from the memory established during the initial manufacturing and calibration operation, steps 72, 74, 76, and 78, and set using the respective actuators, numeral 82. The result is an optimum image reaching the sensor 47 for all desired viewing (pointing) angles of the optical train.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system, comprising:

a window having a curved outer surface and a curved inner surface;

an optical corrector adjacent to the curved inner surface of the window and having an optical corrector shape responsive to a shape of the window, the optical corrector having an inner surface and an outer surface, at least one of the inner surface and the outer surface of the optical corrector having a shape described by $$z = \frac{cr^2}{1+\sqrt{1-(1+k)c^2r^2}} + \sum_{j=1}^{j=66} C_{j+1} Z_j$$

where z is a coordinate oriented perpendicular to a reference plane, c is a constant vertex curvature, $r^2=x^2+y^2$, x and y are Cartesian coordinates lying in the reference plane, k is a conic constant, $C_{j+1}$ is a constant coefficient for $Z_j$, and $Z_j$ is the jth Zernike polynomial term;

an optical train positioned such that the optical corrector lies between the curved window and the optical train, the optical train including at least one optical element operable to alter an optical ray incident thereon;

a movable optical train support upon which the optical train is mounted; and a sensor disposed to receive the optical ray passing sequentially through the window, the optical corrector, and the optical train.

2. The optical system of claim 1, wherein the optical corrector comprises an arch of transparent material having a curvature different from a curvature of the window.

3. The optical system of claim 1, wherein the optical train support includes a gimbal upon which at least one of the optical elements is mounted.

4. The optical system of claim 1, wherein the optical train support includes a roll-nod gimbal upon which at least one of the optical elements is mounted.

5. The optical system of claim 1, wherein the optical element is selected from the group consisting of a lens, a mirror, and a prism.

6. The optical system of claim 1, further including a movable optical corrector support upon which the optical corrector is mounted.

7. The optical system of claim 1, wherein the window is mounted to a housing having an axis of elongation.

8. The optical system of claim 7, further including
a movable optical corrector support upon which the optical corrector is mounted.

9. The optical system of claim 8, wherein the optical corrector support is movable in a direction parallel to the axis of elongation.

10. The optical system of claim 8, wherein the optical corrector support is rotatable about the axis of elongation.

11. The optical system of claim 7, wherein the optical train support is movable in a direction parallel to the axis of elongation.

12. The optical system of claim 1, wherein the optical corrector comprises a surface of revolution about the z axis.

13. The optical system of claim 1, wherein the optical corrector comprises a segment of a surface of revolution about the z axis.

* * * * *